United States Patent
Otsuka

(10) Patent No.: US 8,792,562 B2
(45) Date of Patent: Jul. 29, 2014

(54) MOVING IMAGE ENCODING APPARATUS AND METHOD FOR CONTROLLING THE SAME

(75) Inventor: Katsumi Otsuka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1213 days.

(21) Appl. No.: 12/234,036

(22) Filed: Sep. 19, 2008

(65) Prior Publication Data

US 2009/0092191 A1  Apr. 9, 2009

(30) Foreign Application Priority Data

Oct. 4, 2007 (JP) .................................. 2007-261243

(51) Int. Cl.
*H04N 7/26* (2006.01)
(52) U.S. Cl.
USPC .................................................... 375/240.26
(58) Field of Classification Search
USPC ....................................... 375/240.02, 240.26
See application file for complete search history.

(56) References Cited

U.S. PATENT DOCUMENTS

| | | | |
|---|---|---|---|
| 5,661,523 A | 8/1997 | Yamane | |
| 5,703,646 A | 12/1997 | Oda | |
| 5,949,956 A | 9/1999 | Fukuda | |
| 6,115,421 A | 9/2000 | Katta et al. | |
| 6,173,012 B1 | 1/2001 | Katta et al. | |
| 7,778,350 B2 | 8/2010 | Futagi et al. | |
| 2001/0007435 A1 | 7/2001 | Ode et al. | |
| 2002/0064232 A1* | 5/2002 | Fukuhara et al. | ........ 375/240.26 |
| 2003/0031259 A1* | 2/2003 | Youn et al. | ............... 375/240.24 |
| 2004/0179591 A1 | 9/2004 | Wenger et al. | |
| 2005/0036698 A1 | 2/2005 | Beom | |
| 2005/0047509 A1 | 3/2005 | Lee et al. | |

FOREIGN PATENT DOCUMENTS

| | | |
|---|---|---|
| JP | 09-294267 A | 11/1997 |
| JP | 3112035 B | 11/2000 |
| JP | 3265818 B | 3/2002 |
| JP | 3268306 B | 3/2002 |
| JP | 3358620 B | 12/2002 |
| JP | 2003-061051 A | 2/2003 |

OTHER PUBLICATIONS

U.S. Appl. No. 12/234,004, filed Sep. 19, 2008, Katsumi Otsuka.
The above US references were cited in a Aug. 30, 2011 U.S. Office Action, a copy of which is enclosed, that issued in related U.S. Appl. No. 12/234,004.
The above reference was cited in a May 14, 2012 US Final Office Action that issued in related U.S. Appl. 12/234,004, a copy of which is enclosed.

* cited by examiner

*Primary Examiner* — Gilberto Barron, Jr.
*Assistant Examiner* — David Le
(74) *Attorney, Agent, or Firm* — Cowan, Liebowitz & Latman, P.C.

(57) ABSTRACT

The invention provides encoded moving image data having good image quality even in a scene having a high difficulty level. A unit counts a number of pictures to determine a break between scenes. A unit encodes block by block in an inputted picture. A unit calculates a block distortion between a decoded picture and a picture before being encoded. A unit calculates a surplus encoded data amount with respect to an encoded data amount equally allocated to each scene from the encoded data amount of each picture and a preset sequence target bit rate. A target encoded data amount is calculated based on an average block distortion of a scene and the surplus encoded data amount. The encoded data amount of the first picture of a scene is compared with a threshold, and the initial parameter is corrected to determine the parameter for encoding the second and subsequent pictures.

9 Claims, 6 Drawing Sheets

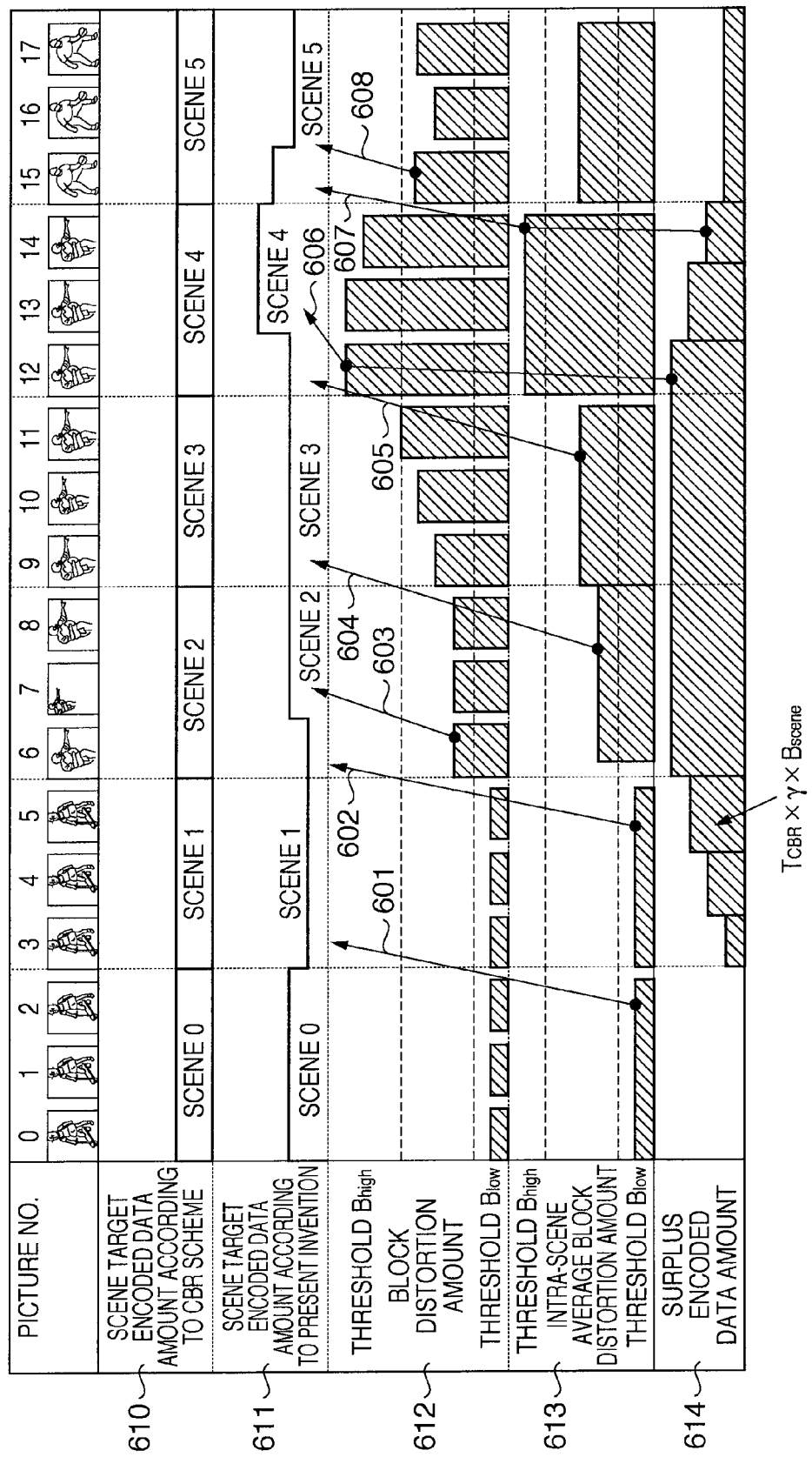

MOVING IMAGE ENCODING APPARATUS AND METHOD FOR CONTROLLING THE SAME

BACKGROUND OF THE INVENTION

1. Field of the Invention

The present invention relates to a moving image encoding technique for real time variable bit rate encoding, and more particularly to a technique for guaranteeing recording time in advance when recording an encoded stream on a storage medium.

2. Description of the Related Art

Recent significant advances in digital signal processing technology have enabled recording of moving images on storage media and transfer of moving images through transmission lines, which were difficult to achieve in the past. For this, the respective pictures that constitute a moving image are compression-encoded to significantly reduce its data amount. As a typical method of this compression encoding process, there is, for example, the MPEG (Moving Picture Experts Group) scheme.

When a series of pictures are compression-encoded in accordance with the MPEG scheme with the condition of a constant bit rate, the encoded data amount differs significantly depending on a scene made up of a plurality of pictures, spatial frequency characteristics of pictures, the correlation between pictures, and the quantizer scale value. Encoded data amount control is an important technique for minimizing encoding distortion when achieving an apparatus that has such encoding characteristics.

Algorithms for realizing the encoded data amount control can be roughly classified into two types: constant bit rate encoding scheme (hereinafter referred to as "CBR scheme") and variable bit rate encoding scheme (hereinafter referred to as "VBR scheme"). Ordinarily, the VBR scheme is known to provide decoded pictures of better image quality than the CBR scheme because the VBR scheme assigns codes adaptively depending on the difficulty level of encoding. The adaptive assignment of codes is realized by, for example, assigning a high bit rate to a scene with a high difficulty level of encoding and assigning a low bit rate to a scene with a low difficulty level of encoding.

As the CBR scheme, TM5 (Test Model 5 (Test Model Editing Committee: "Test Model 5", ISO/IEC JTC/SC29/WG11/N0400 (April 1993))) that was proposed in the course of standardization of MPEG-2 encoding scheme and a scheme disclosed in Japanese Patent No. 3112035 are known.

Meanwhile, the following documents disclose a technique for achieving the VBR scheme in real time (i.e., 1-pass).
Japanese Patent Laid-Open No. H9-294267
Japanese Patent No. 3265818
Japanese Patent Laid-Open No. 2003-61051
Japanese Patent No. 3268306
Japanese Patent No. 3358620

Japanese Patent Laid-Open No. H9-294267 attempts to improve image quality with the VBR scheme by solving the problems encountered with the CBR scheme. In the CBR scheme, if the encoded data amount that is generated in a GOP (Group of Pictures) is excessively greater than the target encoded data amount of the GOP, the next target encoded data amount tries to absorb this surplus, resulting in the problem of image quality degradation. FIG. 2 shows a transition in encoded data amount generated on a GOP-by-GOP basis according to the VBR scheme of Japanese Patent Laid-Open No. H9-294267. It can be seen from FIG. 2 that the generated encoded data amount increases sharply in GOP5 because GOP5 has a high difficulty level of encoding. For this reason, the generated encoded data amount decreases gradually from GOP6 toward GOP9. In order to achieve such a gradual change in encoded data amount generated in GOPs, the target encoded data amount R(j) of the jth GOP is determined using the following equations.

$$DIFF(j)=DIFF(j-1)+B(j-1)-Tg \qquad (1)$$

$$R(j)=Tg-(1/T)\times DIFF(j) \qquad (2)$$

In the equations, B(j) represents an encoded data amount generated in the jth GOP, Tg represents a target encoded data amount equally allocated to each GOP based on a given target bit rate, and T is a constant equal to or greater than 2. As is obvious from the equations (1) and (2), the target encoded data amount R(j) is determined according to DIFF(j), which is the accumulation of the encoded data amounts generated in GOPs in the past.

According to Japanese Patent No. 3265818 and Japanese Patent Laid-Open No. 2003-61051, a feedforward type VBR scheme is achieved by performing detection on a picture group made up of a plurality of pictures and a picture to be encoded using a means for detecting difficulty level of encoding, called "encoding difficulty information calculation units 301 and 302" as shown in FIG. 3. According to this method, a picture group made up of a plurality of pictures is divided by a picture group dividing unit 300, and the difficulty level of encoding of the picture group is calculated by the encoding difficulty information calculation unit 301. Because target encoded data amount calculation units 303 and 304 can variably assign a target encoded data amount to the picture group according to the calculated difficulty level of encoding, a variation in image quality of decoded pictures can be suppressed.

However, the above-described conventional techniques have the following problems.

First, in the case of Japanese Patent Laid-Open No. H9-294267, when determining a target encoded data amount R(j) for a GOP to be encoded, the target encoded data amount is not determined as appropriate according to the difficulty level of encoding because reference is made only to the encoded data amounts generated for the already encoded GOPs (the zeroth, first, . . . , the (j−1)th GOP). In the case of Japanese Patent Laid-Open No. H9-294267, focus is given on the target encoded data amounts of GOPs after the occurrence of the sharp increase in the generated encoded data amount, and merely the encoded data amount is caused to decrease gradually. The image quality degradation of decoded pictures are improved locally as compared to the CBR scheme, but it is difficult to improve the degradation of the image quality of decoded pictures throughout a sequence.

In the case of Japanese Patent No. 3265818 and Japanese Patent Laid-Open No. 2003-61051, the average and maximum bit rates are guaranteed, but the maximum encoded data amount is not guaranteed. This means, when recording on a storage medium of an imaging device such as a digital video camera, the user may not know in advance how long the recording takes. In this case, even if the user specifies a bit rate before the start of imaging, a situation may occur in which the generated encoded data amount of a sequence exceeds the product obtained by multiplying the bit rate by the imaging time.

In the case of Japanese Patent Laid-Open No. 2003-61051, the encoding difficulty information calculation units 301 and 302 require an encoding means similar to an encoding unit 305, which makes the processing load very heavy. This Japanese Patent Laid-Open No. 2003-61051 discloses the use of spatial activity to determine a difficulty level of encoding, but the use of spatial activity is insufficient to predict a difficulty level of encoding in the encoding unit 305.

There is another method, called 2-pass encoding method, as disclosed in Japanese Patents Nos. 3268306 and 3358620, which disclose a method for achieving a VBR scheme. According to this method, a difficulty level of encoding of each scene is extracted during the first pass, and in the second pass, a target encoded data amount is assigned to each scene according to the extracted difficulty level of encoding. Accordingly, the image quality can be improved throughout a sequence as compared to the CBR scheme. Imaging devices, however, require real time encoding, and therefore it is difficult to implement 2-pass encoding.

SUMMARY OF THE INVENTION

The present invention has been conceived in light of the above problems, and it is an object of the present invention to provide encoded moving image data which has good image quality even in a scene having a high difficulty level of encoding under conditions of a given target bit rate by controlling the target encoded data amount of a scene while considering the degree of image quality degradation. It is another object of the present invention to guarantee the maximum encoded data amount determined based on the target bit rate and sequence length without depending on the length of a sequence to be encoded.

In order to solve the problems, a moving image encoding apparatus of the present invention is configured as follows. Specifically, a moving image encoding apparatus that encodes moving images, including: a dividing unit adapted to divide a moving image that is made up of pictures arranged along a temporal axis into scenes, each of which is made up of a preset plurality of pictures; an encoding unit adapted to encode an inputted picture block by block, the block being configured of a plurality of pixels, according to a parameter that determines a given quantization scale so as to generate encoded data; an encoded data amount calculation unit adapted to calculate an encoded data amount of a picture generated by the encoding unit as well as a total encoded data amount of a scene; a block distortion calculation unit adapted to decode the encoded data generated by the encoding unit, and calculate a distortion amount at a boundary position between the blocks between a decoded picture and a picture before being encoded as a picture distortion amount as well as an average of distortion amounts of pictures that constitute a scene; a surplus encoded data amount calculation unit adapted to calculate a surplus encoded data amount with respect to an encoded data amount equally allocated to each scene from the encoded data amount of each picture calculated by the encoded data amount calculation unit and a preset target bit rate; and a parameter determination unit adapted to calculate a target encoded data amount based on the scene distortion amount calculated by the scene distortion calculation unit and the surplus encoded data amount calculated by the surplus encoded data amount calculation unit to determine an initial parameter for a scene to be encoded next that is provided to the encoding unit based on the calculated target encoded data amount, and adapted to compare an encoded data amount of the first picture of a scene with a preset threshold range and correct the initial parameter according to a result obtained through the comparison to determine a parameter for encoding the second and subsequent pictures of the scene.

According to the present invention, a scene target encoded data amount is controlled according to the block distortion amount which is an index that represents the degree of image quality degradation, and it is therefore possible to obtain encoded moving image data which has high image quality even in a scene having a high difficulty level of encoding under conditions of a given target bit rate. Furthermore, because the scene target encoded data amount of only a scene in which a surplus encoded data amount occurs is increased, the maximum encoded data amount that can be determined based on the target bit rate and sequence length can be guaranteed.

Further features of the present invention will become apparent from the following description of exemplary embodiments with reference to the attached drawings.

BRIEF DESCRIPTION OF THE DRAWINGS

FIG. 6 is a diagram used to illustrate a transition in scene target encoded data amount of a moving image encoding apparatus according to an embodiment.

DESCRIPTION OF THE EMBODIMENTS

Hereinafter, an embodiment of the present invention will be described in detail with reference to the accompanying drawings.

The present embodiment illustrates an example when applied to a moving image encoding apparatus that implements an encoding scheme that performs inter-frame prediction. As the encoding scheme that performs inter-frame prediction, for example, MPEG-1, MPEG-2, MPEG-4, and so on are known.

Figure 1:
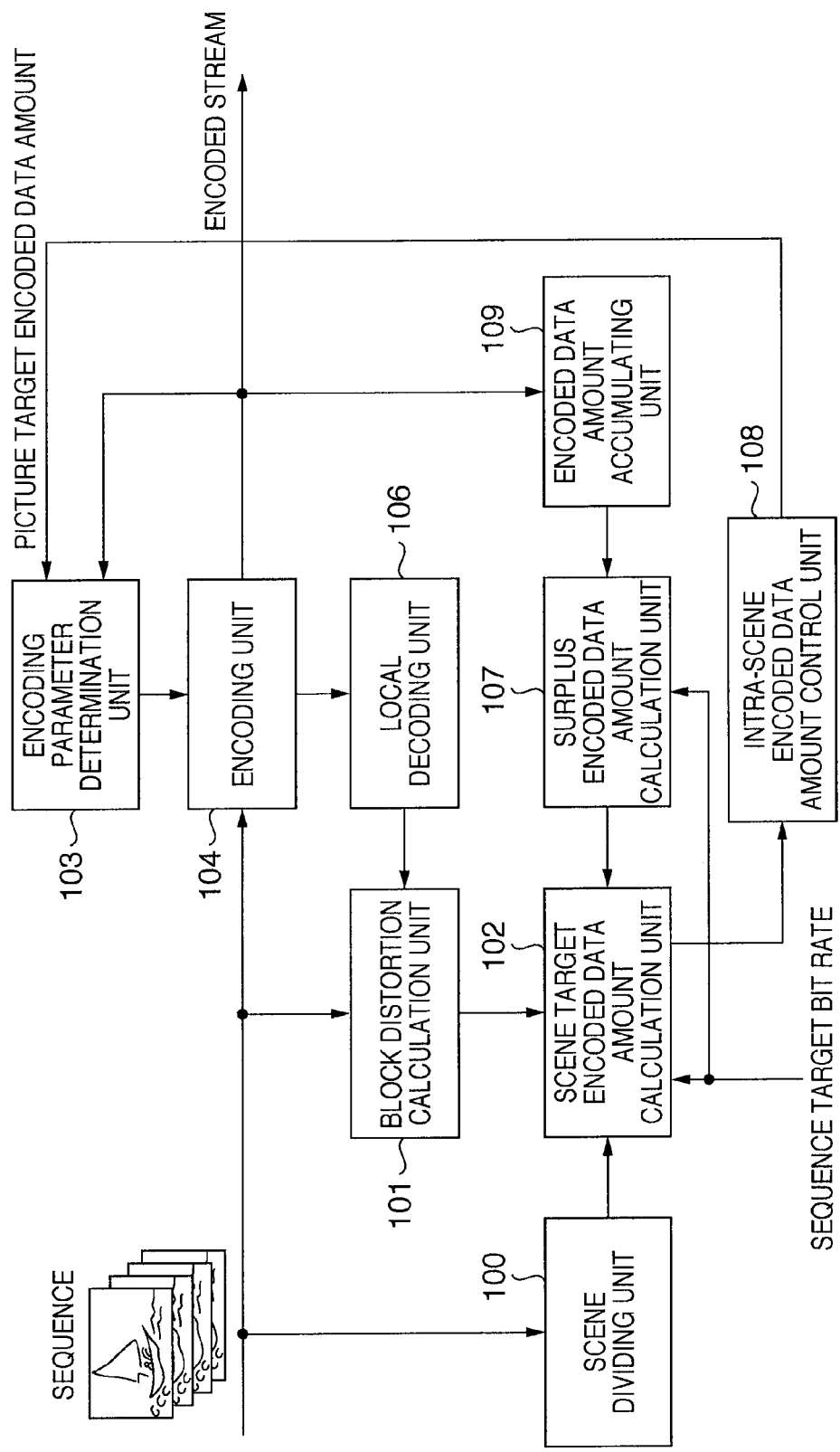
FIG. 1 is a schematic block diagram of a moving image encoding apparatus according to the present invention.
Figure 2:
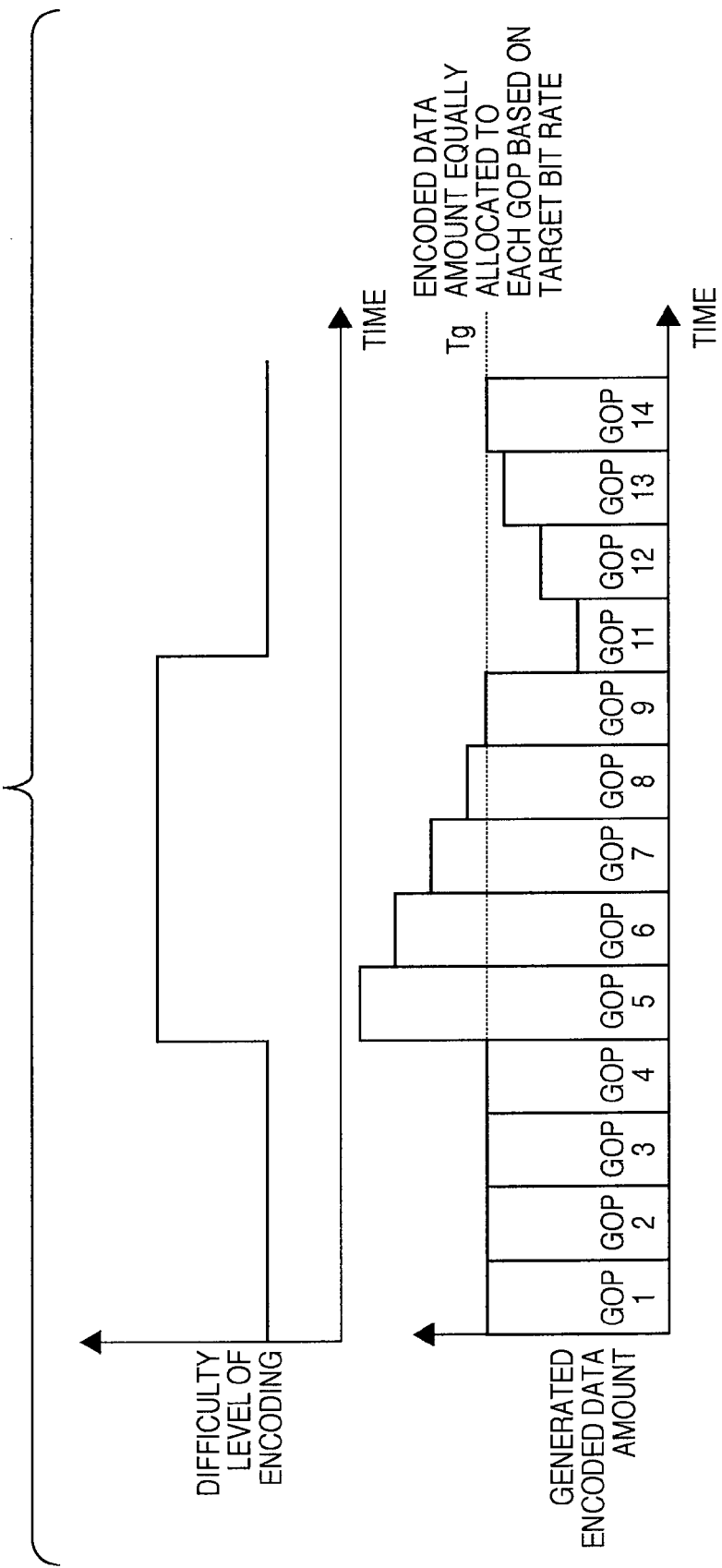
FIG. 2 is a diagram used to illustrate a conventional technique.
Figure 3:
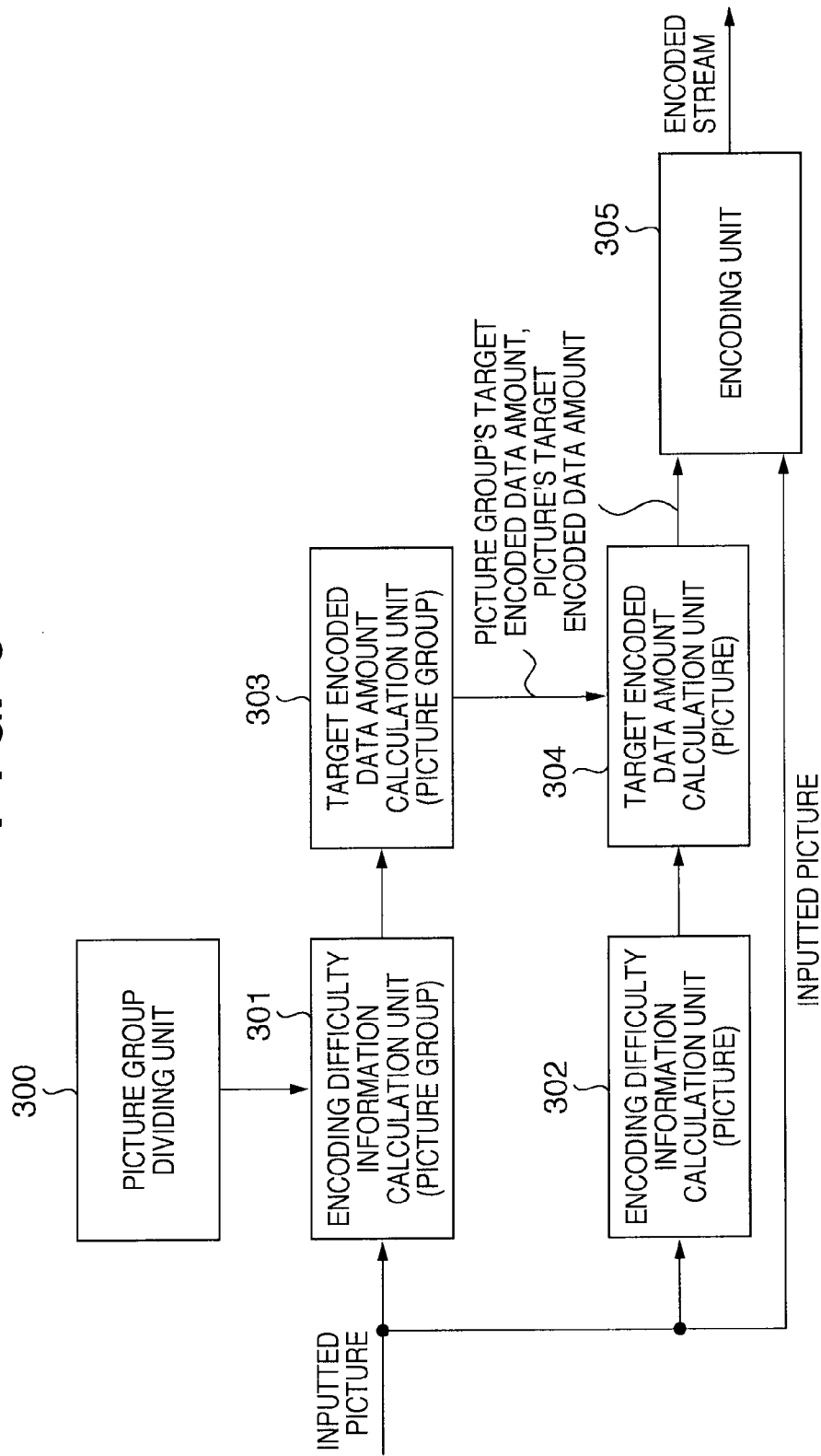
FIG. 3 is a diagram used to illustrate a conventional technique.

FIG. 1 is a schematic configuration diagram of a moving image encoding apparatus of the present embodiment. This apparatus includes a scene dividing unit 100, a block distortion calculation unit 101, a scene target encoded data amount calculation unit 102, an encoding parameter determination unit 103, an encoding unit 104, a local decoding unit 106, a surplus encoded data amount calculation unit 107, an intra-scene encoded data amount control unit 108, and an encoded data amount accumulating unit 109. In the present embodiment, it is assumed that the encoding unit 104 shown in FIG. 1 performs encoding according to the MPEG-4 encoding scheme. It is also assumed here that moving image data to be encoded is generated by a video camera, but it may be generated by a storage medium that stores non-encoded moving image data, and there is no limitation on the type of the input source.

[Description of Configuration]

Figure 4:
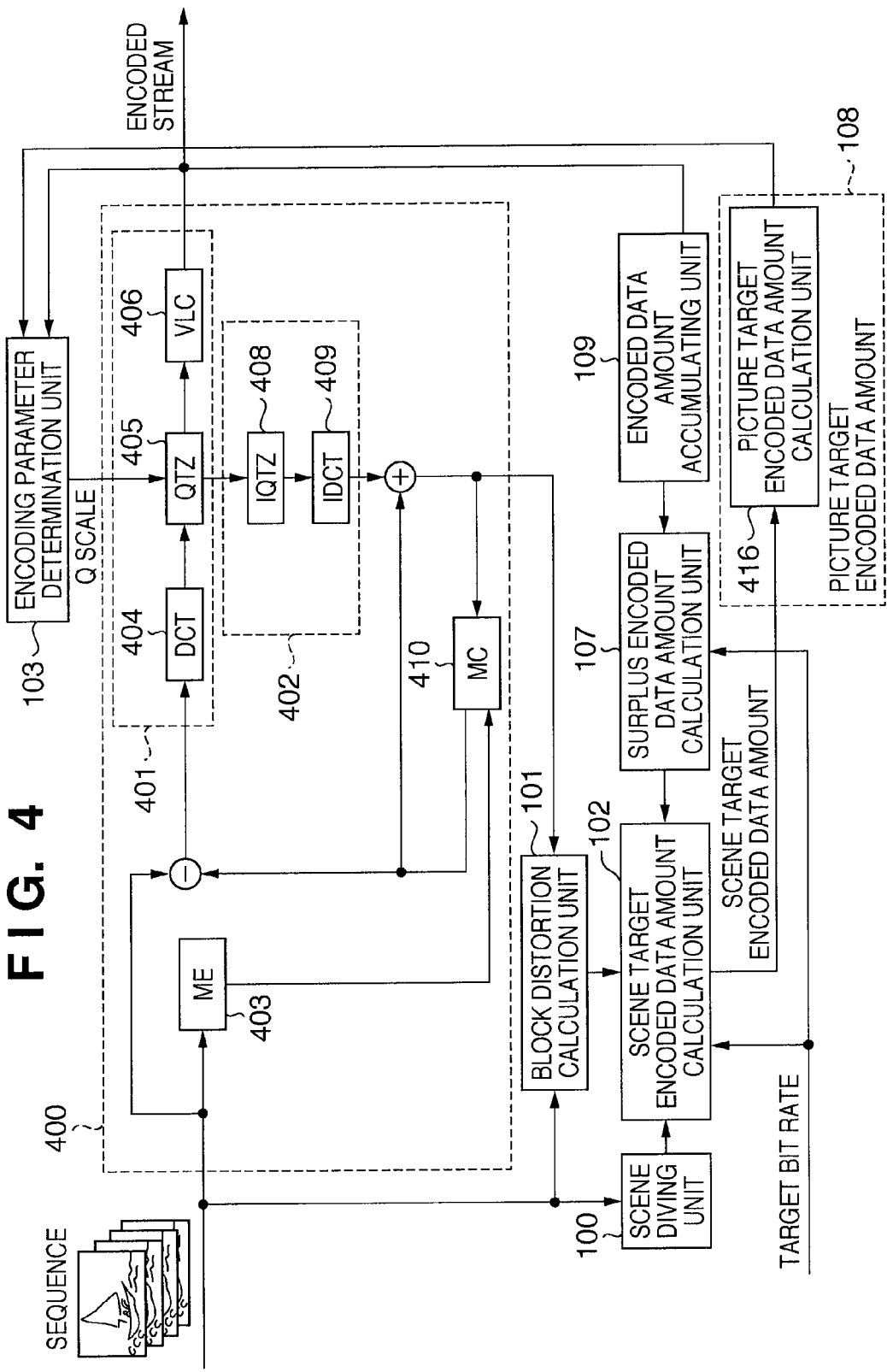
FIG. 4 is a block diagram specifically showing a moving image encoding apparatus according to an embodiment.

FIG. 4 shows the moving image encoding apparatus according to the present embodiment in further detail.

An MPEG-4 encoding unit 400 is configured to include the encoding unit 104 and the local encoding unit 106 shown in FIG. 1. The MPEG-4 encoding unit 400 further includes an ME 403 for performing motion detection processing, an MC 410 for performing motion compensating processing, a block encoding unit 401, and a local block decoding unit 402. The block encoding unit 401 includes a DCT conversion unit 404, a quantization unit (QTZ) 405, and an entropy encoding unit (VLC) 406.

The processing performed by the MPEG-4 encoding unit 400 is disclosed in, for example, ISO/IEC 14496-2, and thus its detailed description is omitted here.

Figure 5:
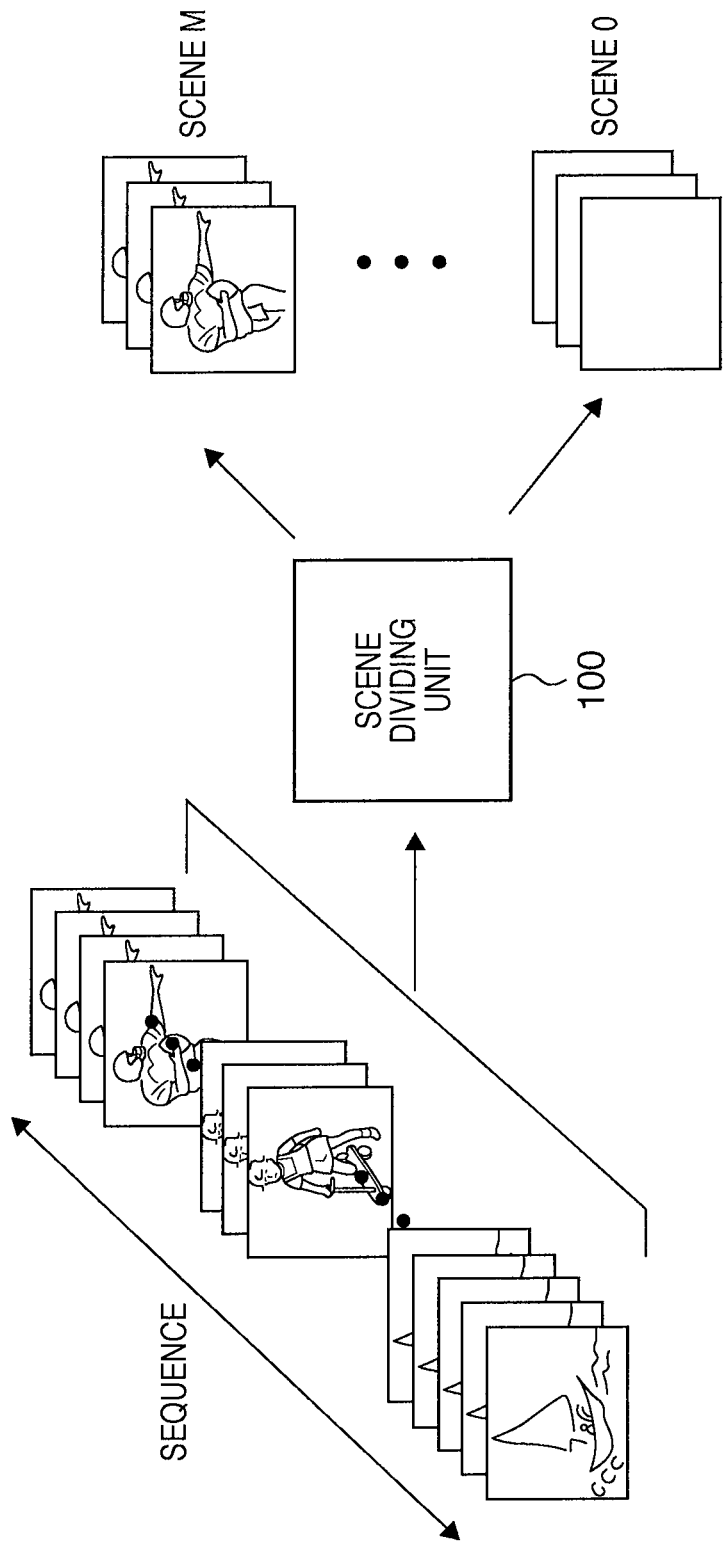
FIG. 5 is a diagram showing an example of how a sequence is divided into scenes by a scene dividing unit.

The scene dividing unit 100 divides inputted pictures of a whole sequence (a moving image made up of a plurality of pictures that are arranged along a temporal axis) into scenes, each of which is made up of a plurality of pictures. The number of pictures N that constitute a scene may be fixed or variable throughout a sequence. For the sake of simplifying the description, it is assumed here that the scene dividing unit 100 outputs a signal indicative of the timing of a breaking of the scene to the scene target encoded data amount calculation unit 102 every time three pictures are inputted (i.e., N=3) as shown in FIG. 5.

The block distortion calculation unit 101 sequentially receives an input of part of a reconstructed picture in which the outputs of the block local decoding unit 402 and the MC 410 are added. Then, a block distortion is calculated for each macroblock, the macroblock being configured of, for example, a plurality of pixels, using the macroblock located at the same coordinates in the same picture as a picture having been inputted to the MPEG-4 encoding unit 400. By adding together the block distortion of each macroblock, a picture distortion in an encoded picture with respect to the original picture can be calculated. As used herein, the amount that represents the degree of block distortion in a picture is referred to as a "block distortion amount". In other words, it can be said that block distortion amount is an index that represents the degree of image quality degradation. The block distortion calculation unit 101 calculates a block distortion amount for at least one picture and outputs information indicative of the block distortion amount to the scene target encoded data amount calculation unit 102.

The encoded data amount accumulating unit 109 calculates an encoded data amount for each picture by sequentially accumulating the encoded length of an encoded stream that is outputted from the block encoding unit 401, and outputs the calculated encoded data amount to the surplus encoded data amount calculation unit 107. The encoded data amount accumulating unit 109 also accumulates the encoded data amount calculated for each picture of a scene, and outputs the encoded data amount of the scene (total encoded data amount per scene) to the surplus encoded data amount calculation unit 107. The encoded data amount accumulating unit 109 resets the encoded data amount for each picture and scene that is calculated for the previous scene to zero before another scene (three pictures in the present embodiment) is inputted.

The surplus encoded data amount calculation unit 107 calculates a surplus encoded data amount based on the encoded data amount for each picture of a scene that is inputted from the encoded data amount accumulating unit 109 and the encoded data amount for each scene when a given target bit rate is encoded according to the CBR scheme. After all of the pictures included in a scene have been encoded, the surplus encoded data amount calculation unit 107 outputs the surplus encoded data amount to the scene target encoded data amount calculation unit 102.

The scene target encoded data amount calculation unit 102 calculates an initial target encoded data amount for the next scene based on the surplus encoded data amount that is inputted from the surplus encoded data amount calculation unit 107 and the block distortion amount that is inputted from the block distortion calculation unit 101. In other words, the scene target encoded data amount is calculated for each scene before the first picture of a scene is inputted to the MPEG-4 encoding unit 400. The scene target encoded data amount to be calculated is calculated adaptively according to the surplus encoded data amount and the block distortion amount with reference to an encoded data amount obtained on the assumption that encoding is performed according to the CBR scheme. The scene target encoded data amount calculation unit 102 calculates a target encoded data amount for the second and subsequent pictures of a scene based on the encoded data amount of the first picture of the scene.

A picture target encoded data amount calculation unit 416 calculates a picture target encoded data amount that is used when encoding the next scene based on the scene target encoded data amount that is inputted from the scene encoded data amount calculation unit 102. The assignment of scene target encoded data amount to each picture of a scene can be calculated regardless of the CBR scheme, which is a conventional technique, or the VBR scheme according to the present invention. The picture target encoded data amount can be calculated using, for example, the TM5 scheme, which is a conventional technique for CBR scheme. In the present embodiment, the TM5 scheme is used.

Similar to the picture target encoded data amount calculation unit 416, a conventional technique can be used for the encoding parameter determination unit 103. The encoding parameter determination unit 103 calculates a Q scale, which serves as an encoding parameter of the MPEG-4 encoding unit 400, and sets the Q scale in the quantization unit (QTZ) 405. For example, when the TM5 scheme is used, the Q scale is calculated for each macroblock by sequentially accumulating the picture target encoded data amount that is inputted from the picture target encoded data amount calculation unit 416 and the encoded length of an encoded stream outputted from the block encoding unit 401. The quantization unit 405 divides each conversion coefficient generated by the DCT conversion unit 404 by a quantization step indicated by the quantization scale, and thus the value obtained by the division will be smaller as the quantization scale increases. Accordingly, as the quantization scale increases, the data amount of encoded data generated by the entropy encoding unit (VLC) 406 will be smaller.

[Description of Process Flow]

A process flow performed by the moving image encoding apparatus shown in FIG. 4 will be described next in detail.

FIG. 6 shows a transition in scene target encoded data amount when a sequence made up of six scenes is encoded by the moving image encoding apparatus of the present embodiment. In FIG. 6, reference numeral 610 indicates scene target encoded data amount of each scene when the CBR scheme, which is a conventional technique, is used, and the area of the rectangle of each scene corresponds to the scene target encoded data amount. It can be seen from FIG. 6 that the scene target encoded data amount when the CBR scheme is used is constant throughout the scenes 0 to 5.

Reference numeral 611 indicates a transition in scene target encoded data amount obtained according to the present embodiment. Likewise, reference numeral 612 indicates the block distortion amount of each picture.

The block distortion calculation unit 101 determines a block distortion amount $B_{cprev}$ by performing the following computation. Here, the number of pixels in the horizontal direction of a picture inputted to the MPEG-4 encoding unit 400 is set to x_size, and the number of pixels in the vertical direction is set to y_size. If the coordinate in the horizontal direction is denoted by J, and the coordinate in the vertical direction is denoted by I, the pixel value of the picture inputted to the MPEG-4 encoding unit 400 is expressed by CIN(J, I). Similarly, the pixel value of a reconstructed picture that is a picture outputted by the block local decoding unit 402 is expressed by COUT(I,J). Likewise, "X % Y" represents a function that returns a remainder that is obtained by dividing an integer X by an integer Y.

```
for (I=0;I < y_size -1; I++){
  for (J= 0; J < x_size -1; J++){
    if (J % 8 == 7){
      EDGEin = ABS (CIN(J,I)-CIN(J,I+1));
      EDGEout = ABS (COUT(J,I) - COUT(J,I+1));
      MSEblk ++ = POWER(EDGEin - EDGEout));}
    else{
      if( I % 8 == 7){
        EDGEin = ABS(CIN(J,I) - CIN(J+1,I));
        EDGEout = ABS(COUT(J,I) - COUT(J+1,I));
        MSEblk++ = POWER(EDGEin - EDGEout));}
  } }
  Bcprev = MSEblk/MSEall;      ...(3)
```

In the above, MSEall represents the sum of squared differences between CIN(J,I) and COUT(J,I) in an entire picture.

$$MSEall = \Sigma\Sigma\{CIN(J,I) - COUT(J,I)\}^2$$

The process (3) shown above will be explained briefly below. The DCT conversion unit 404 performs conversion for each 8×8 element (pixel or difference between pixels), and thus the block boundary position is located between "8n−1" and "8n" in the horizontal and vertical coordinates indicated by I and J. When "J % 7=7" or "I % 7=7" in the above is satisfied, it indicates that the block boundary is determined. The absolute value of the difference between elements that are located on the boundaries between two blocks adjacent in the horizontal direction in the original image and the absolute value of the difference between elements that are located on the boundaries between the corresponding two blocks in the decoded image data obtained through the IDCT 409. Then, the difference between the absolute values is added to the variable MSEblk (when J % 8=7). Because there are also adjacent blocks in the vertical direction, a distortion amount at boundaries (when I % 8=7) between two adjacent blocks in the vertical direction is calculated, and is added to MSEblk. The variables I and J are changed to the size of the image, it can be said that the resultant $B_{cprev}$ is a value that represents the "difference" total of the difference of each block boundary of a picture before being encoded and the difference of each block boundary of a picture obtained by decoding a result obtained by encoding. To put it more simply, $B_{cprev}$ is an index that represents the degree of distortion that occurs at a boundary between blocks in a decoded image.

Returning to the explanation of FIG. 6, thresholds $B_{high}$ and $B_{low}$ are constants that are set in advance in the scene target encoded data amount calculation unit 102 and represent the degree of image quality degradation of the reconstructed picture that is outputted from the block local decoding unit 402, which includes an inverse quantization unit 408 and an inverse DCT unit 409. The threshold $B_{high}$ is a reference value for determining whether or not to increase the scene target encoded data amount for the current scene in the scene target encoded data amount calculation unit 102 when image quality degradation due to block distortion is severe. The threshold $B_{low}$ is a reference value for determining whether or not to decrease the scene target encoded data amount for the current scene when little image quality degradation due to block distortion occurs.

Reference numeral 613 indicates an average of the block distortion amounts of pictures of each scene that are indicated under reference numeral 612. In the scene target encoded data amount calculation unit 102, thresholds $B_{high}$ and $B_{low}$ are provided, similar to reference numeral 613. By comparing these thresholds with the average block distortion amount of a scene, it is determined whether the scene target encoded data amount of the next scene is increased or decreased.

Reference numeral 614 indicates a transition of surplus encoded data amount of the scene target encoded data amount according to the present invention with respect to that according to the CBR scheme. The surplus encoded data amount is calculated by the surplus encoded data amount calculation unit 107 each time the MPEG encoding unit 400 finishes encoding a scene.

The processes indicated by arrows 601 to 608 in FIG. 6 will be described.

The arrow 601 indicates that the first scene target encoded data amount of Scene 1 is calculated by the scene target encoded data amount calculation unit 102 after Picture No. 2, which is the last picture of Scene 0, has been encoded. Because the intra-scene average block distortion amount of Scene 0 is lower than the threshold range (not higher than a threshold indicated by $B_{low}$), the scene target encoded data amount calculation unit 102 predicts that the next Scene 1 is made up of pictures having a low difficulty level of encoding similar to Scene 0. For this reason, an encoded data amount corresponding to the intra-scene average block distortion amount is subtracted from the scene target encoded data amount according to the CBR scheme as shown by the following equation so as to obtain a scene target encoded data amount for Scene 1.

$$T(N) = T_{CBR} - T_{CBR} \times \gamma \times B_{scene} \quad (4)$$

In this equation, T(N) represents the scene target encoded data amount of Scene N, and $T_{CBR}$ represents the scene target encoded data amount according to the CBR scheme. γ is a constant that is set in the scene target encoded data amount calculation unit 102 in advance. $B_{scene}$ represents the average of the block distortion amounts $B_{cprev}$ of pictures of Scene N−1.

It can be seen that the surplus encoded data amount indicated under reference numeral 614 of FIG. 6 increased by the amount of an encoded data amount $T_{CBR} \times \gamma \times B_{scene}$ that is shown in the second term on the right side of Equation (4) after Picture No. 5 of Scene 1 has been encoded. As for the scene target encoded data amount of Scene 0, which is the first scene of a sequence, because there is no scene that precedes Scene 0, the scene target encoded data amount according to the CBR scheme is used.

Similarly, as in the case of the arrow 601, at the timing indicated by the arrow 602, a scene target encoded data amount is calculated for Scene 2 using Equation (4) after Picture No. 5 has been encoded, and Picture No. 6, which is the first picture of Scene 2, is encoded by the MPEG-4 encoding unit 400. However, the block distortion amount $B_{cprev}$ of Picture No. 6 of Scene 2 is greater than the threshold $B_{low}$. For this reason, in the arrow 603, the scene target encoded data amount of Scene 2 is corrected to the scene target encoded data amount according to the CBR scheme, and outputted from the scene target encoded data amount calculation unit 102 to the picture target encoded data amount calculation unit 416. In other words, for Pictures Nos. 7 and 8, which are the remaining pictures of Scene 2, a picture target encoded data amount is calculated by using the scene target encoded data amount according to the CBR scheme.

In the arrow 604, because the intra-scene average block distortion amount of Scene 2 is greater than the threshold $B_{low}$ and smaller than the threshold $B_{high}$, it is predicted that the target encoded data amount according to the CBR scheme is appropriate, and thus the target encoded data amount according to the CBR scheme is set as the scene target encoded data amount of Scene 3. Similarly, as in the arrow 604, the scene target encoded data amount of Scene 4 is calculated in the arrow 605.

In the arrow 606, because the block distortion amount $B_{cprev}$ of Picture No. 12 of Scene 4 is greater than the threshold $B_{high}$ and there is a surplus encoded data amount, the scene target encoded data amount of Scene 4 is increased (corrected). If there is no surplus encoded data amount, even when the block distortion amount $B_{cprev}$ is greater than the threshold $B_{high}$, the target encoded data amount according to the CBR scheme is used without increasing the scene target encoded data amount.

In the arrow 607, because the intra-scene average block distortion amount of Scene 4 is greater than the threshold $B_{high}$ and there is a surplus encoded data amount, the scene target encoded data amount of Scene 5 is increased. Similar to the case of the arrow 606, if there is no surplus encoded data amount, the target encoded data amount according to the CBR scheme is used without increasing the scene target encoded data amount. In the arrow 608, because the block distortion amount $B_{cprev}$ of Picture No. 15 of Scene 5 is smaller than the threshold $B_{high}$ and greater than the threshold $B_{low}$, the target encoded data amount according to the CBR scheme is used as the scene target encoded data amount for the remaining pictures of Scene 5.

As described above, according to the present invention, the scene target encoded data amount is controlled according to the block distortion amount, which is an index that represents the degree of image quality degradation. Through this, it is possible to obtain encoded moving image data which has high image quality even in a scene having a high difficulty level of encoding under conditions of a given target bit rate. Furthermore, because the scene target encoded data amount of only a scene in which a surplus encoded data amount occurs is increased, the maximum encoded data amount that can be determined based on the target bit rate and sequence length can be guaranteed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-261243, filed on Oct. 4, 2007, which is hereby incorporated by reference herein in its entirety.

What is claimed is:

1. A moving image encoding apparatus that encodes moving images, comprising:
    a dividing unit which divides a moving image that is made up of pictures arranged along a temporal axis into scenes, where each of the scenes is made up of a preset number of pictures;
    an encoding unit which encodes an inputted picture block by block, the block being configured of a plurality of pixels, according to a given quantization scale so as to generate encoded data;
    an encoded data amount calculation unit which calculates an encoded data amount of a picture generated by the encoding unit as well as a total encoded data amount of a scene;
    a distortion calculation unit which decodes the encoded data generated by the encoding unit, and calculate a distortion amount, at the boundary positions of the blocks, between a decoded picture and a picture before being encoded as a picture distortion amount as well as an average of picture distortion amounts of pictures that constitutes a scene;
    a surplus encoded data amount calculation unit which calculates a surplus encoded data amount with respect to an encoded data amount equally allocated to each scene from the encoded data amount of each picture calculated by the encoded data amount calculation unit;
    a scene target encoded data amount calculation unit which calculates an initial target encoded data amount for a subsequent scene based on the average calculated by said distortion calculation unit and the surplus encoded data amount calculated by the surplus encoded data amount calculation unit;
    a picture target encoded data amount calculation unit which, if a picture of interest is first in a scene of interest, compares the picture distortion of the picture of interest calculated by said distortion calculation unit with a predetermined threshold range, and calculates a target encoded data amount for subsequent pictures in the scene of interest by adjusting, according to the comparison result and the surplus encoded data amount calculated by the surplus encoded data amount calculation unit, the initial target encoded data amount of the scene of interest; and
    a quantization scale determination unit which determines a quantization scale to be set to said encoding unit for encoding a subsequent picture, based on the target encoded data amount calculated by said picture target encoded data amount calculation unit.

2. The moving image encoding apparatus according to claim 1, wherein the encoding unit performs encoding according to MPEG-4.

3. The moving image encoding apparatus according to claim 1, wherein the scene target encoded data amount calculation unit determines the initial target encoded data amount for the subsequent scene based on the distortion amount only when the average calculated by the distortion amount calculation unit is greater than a preset threshold and the surplus encoded data amount calculated by the surplus encoded data amount calculation unit is greater than a preset threshold.

4. The moving image encoding apparatus according to claim 1, wherein the picture target encoded data amount calculation unit determines a target encoded data amount for the subsequent picture only when the average calculated by the distortion calculation unit is equal to or lower than a preset threshold.

5. A method for controlling a moving image encoding apparatus that encodes moving images, the method comprising:
    a dividing step of dividing a moving image that is made up of pictures arranged along a temporal axis into scenes, where each of the scenes is made up of a preset number of pictures;
    an encoding step of encoding an inputted picture block by block, the block being configured of a plurality of pixels, according to a given quantization scale so as to generate encoded data;
    an encoded data amount calculation step of calculating an encoded data amount of a picture generated in the encoding step as well as a total encoded data amount of a scene;
    a distortion calculation step of decoding the encoded data generated in the encoding step, and calculating a distortion amount, at the boundary positions of the blocks, between a decoded picture and a picture before being encoded as a picture distortion amount as well as an average of picture distortion amounts of pictures that constitutes a scene;

a surplus encoded data amount calculation step of calculating a surplus encoded data amount with respect to an encoded data amount equally allocated to each scene from the encoded data amount of each picture calculated in the encoded data amount calculation step;

a scene target encoded data amount calculation step of calculating an initial target encoded data amount for a subsequent scene based on the average calculated in said distortion calculation step and the surplus encoded data amount calculated in the surplus encoded data amount calculation step;

a picture target encoded data amount calculation step of comparing, if a picture of interest is first in a scene of interest, the picture distortion of the picture of interest calculated in said distortion calculation step with a predetermined threshold range, and calculating a target encoded data amount for subsequent pictures in the scene of interest by adjusting, according to the comparison result and the surplus encoded data amount calculated in the surplus encoded data amount calculation step, the initial target encoded data amount of the scene of interest; and a quantization scale determination step of determining a quantization scale to be set in said encoding step for encoding a subsequent picture, based on the target encoded data amount calculated in said picture target encoded data amount calculation step.

6. The method according to claim 5, wherein the encoding step involves encoding according to MPEG-4.

7. The method according to claim 5, wherein the scene target encoded data amount calculation step determining the initial target encoded data amount for the subsequent scene based on the distortion amount only when the average calculated in the distortion amount calculation step is greater than a preset threshold and the surplus encoded data amount calculated in the surplus encoded data amount calculation step is greater than a preset threshold.

8. The method according to claim 5, wherein the picture target encoded data amount calculation step involves determining a target encoded data amount for the subsequent picture only when the average calculated in the scene distortion calculation step is equal to or lower than a preset threshold.

9. A non-transitory computer-readable storage medium that stores a computer program that causes a computer to function as the moving image encoding apparatus according to claim 1 by being loaded and executed by the computer.

* * * * *